(12) United States Patent
Scoca et al.

(10) Patent No.: US 7,295,492 B2
(45) Date of Patent: Nov. 13, 2007

(54) METHOD AND APPARATUS FOR CORRELATION SONAR

(75) Inventors: Anthony L. Scoca, Hicksville, NY (US); Jerry Gabriel Klein, Bellerose, NY (US); James G. Huber, North Babylon, NY (US)

(73) Assignee: Lockheed Martin Corporation, Bethesda, MD (US)

( * ) Notice: Subject to any disclaimer, the term of this patent is extended or adjusted under 35 U.S.C. 154(b) by 55 days.

(21) Appl. No.: 11/327,702

(22) Filed: Jan. 6, 2006

(65) Prior Publication Data

US 2007/0025184 A1 Feb. 1, 2007

Related U.S. Application Data

(60) Provisional application No. 60/690,881, filed on Jun. 15, 2005.

(51) Int. Cl.
 *G01S 15/50* (2006.01)
(52) U.S. Cl. ........................................................ 367/89
(58) Field of Classification Search .................. 367/89; 702/143
See application file for complete search history.

(56) References Cited

U.S. PATENT DOCUMENTS

| 4,244,026 | A | 1/1981 | Dickey, Jr. | |
| 5,315,562 | A | 5/1994 | Bradley et al. | |
| 6,804,167 | B2 | 10/2004 | Scoca et al. | |
| 2004/0165479 | A1* | 8/2004 | Scoca et al. | 367/100 |
| 2006/0171255 | A1* | 8/2006 | Zhu et al. | 367/89 |
| 2007/0025184 | A1* | 2/2007 | Scoca et al. | 367/89 |
| 2007/0064537 | A1* | 3/2007 | Huber et al. | 367/89 |

OTHER PUBLICATIONS

Alison Keary et al., Covelia—A Correlation Sonar Velocity Sensor, www.chelsea.co.uk/technical%20papers/hsl-sut2001-cvl.pdf,H. Scientific Ltd. and Marine Acoustics Ltd., U.K.

* cited by examiner

*Primary Examiner*—Daniel Pihulic
(74) *Attorney, Agent, or Firm*—DeMont & Breyer LLC (57) ABSTRACT

A correlation SONAR that provides improved velocity estimates due to a reduction in random and bias errors is disclosed. Rather than basing the velocity estimate on a single set of primary receiver pairs, one or more additional velocity estimates are generated based on one or more available receiver pair sets having the same velocity vectors as the primary receiver pairs set. Additional velocity estimates also provide a reliability and accuracy improvement by enabling identification and subsequent elimination of erroneous velocity estimates.

18 Claims, 7 Drawing Sheets

METHOD AND APPARATUS FOR CORRELATION SONAR

STATEMENT OF RELATED CASES

This case claims priority of U.S. Provisional Patent Application 60/690,881, filed Jun. 15, 2005, which is incorporated by reference herein.

FIELD OF THE INVENTION

The present invention relates to velocity measurement systems.

BACKGROUND OF THE INVENTION

There are a number of benefits to being able to accurately estimate the velocity of a sea-faring vessel. One is that an accurate estimation of velocity results in improved estimates of ship's position (when those estimates are velocity-based) for submerged vehicles (e.g., submarines, AUVs, UUVs, etc.). This is particularly important for submerged vehicles for which Global Positioning System (GPS) fixes are not available or otherwise kept to a minimum to maintain ship's covertness. Another benefit is that it improves the accuracy of certain on-board missile-delivery systems that employ a technique to obtain a velocity fix, which is then provided as initialization data to the missile before launch (i.e., it reduces missile Circular Error Probable (CEP)).

It is known to apply signal correlation to SONAR technology to measure velocity. See, for example, U.S. Pat. No. 4,244,026 to Dickey and U.S. Pat. No. 5,315,562 to Bradley et al. These systems typically include a sonar source and multiple receivers (i.e., hydrophones), which have a known separation. The SONAR source directs sonic pulses towards the ocean floor, and the receivers detect echoes of those pulses. The velocity of the vessel is then calculated based upon the distance traveled by the vessel between the transmission and reception of a first pulse and a second pulse.

As discussed further below, correlation SONARS rely on selecting a best or maximum "correlation" either between hydrophones or pulses, for the determination of velocity. Maximum correlation occurs when the ray path of an initial SONAR transmission (from the transmitter to the ocean floor, etc., and back to a receiver) of a first detected pulse is equal to the ray path of a second SONAR transmission.

Correlation SONAR systems can be water or ground referenced, and Spatial or Temporal based. A water-referenced correlation SONAR uses echoes reflected from the water beneath a vessel, whereas a ground-referenced correlation SONAR uses echoes reflected from the ocean bottom. A correlation sonar can also be both ground and water based in the sense of having both ground- and water-referenced modes of operation.

Spatial correlation SONAR calculates the velocity of a vessel by transmitting two or more pulses towards the ocean bottom, detecting echoes of the pulses on a planar two-dimensional array of hydrophones, determining which two hydrophones in the array correlate the best, and dividing the distance between those hydrophones by twice the time differential between the pulses. Peak correlation might take place between hydrophones, in which case an interpolation scheme is used. A Temporal correlation SONAR determines velocity by transmitting multiple pulses toward the ocean bottom and detecting echoes of the pulses at a hydrophone array. For a given pair of hydrophones, the system determines which two pulses correlate the best, and calculates velocity by dividing the fixed distance between the hydrophones by twice the time differential between the two correlated pulses.

Velocity estimates from correlation SONAR are subject to a variety of different random errors and bias errors. To the extent that these types of errors can be reduced, the accuracy of the velocity estimates will improve. Correlation SONARS also have integrity issues in which serious performance degradation can occur in the event that there is an undetected failure in a hydrophone or hydrophone channel and the SONAR uses the faulty channel data for its velocity solution. The phrase "hydrophone channel" means the hydrophone itself, as well as the connectors and cabling to channel electronics, the electronics, and associated data-processing components.

SUMMARY OF THE INVENTION

The present invention provides a way to improve the accuracy of velocity estimates from correlation SONAR. The improvement in accuracy is due to a reduction in bias and random error. The present invention also provides a means for detecting failures in a hydrophone or a hydrophone channel and thereby improves the integrity of a SONAR system.

In prior-art correlation SONARs, receiver (i.e., hydrophone) pairings for each of the possible ship's velocity vectors are established. Redundant receiver pairs are not, however, considered. In this context, a "redundant" receiver pair is a pairing of hydrophones in the actual receiver array that has the same spacing and orientation as a different pairing of hydrophones in the array. Since the two pairs have the same spacing and orientation, they are indicative of the same ship's velocity vector. And since the are indicate of the same ship's velocity vector, only one of those receiver pairs, a "primary pairing," has traditionally been used for the velocity estimate.

The inventors recognized that there is an advantage to considering redundant receiver pairs for the velocity calculation. That is, even if a redundant pairing represents the same ship's velocity vector as a primary pairing, there are physical differences between the hydrophone channels that will result in differences in the velocity estimates that are generated from them. In other words, when redundant pairs are considered, there is a reduction in bias and random error in the velocity estimate.

Therefore, in accordance with the illustrative embodiment of present invention, one or more additional velocity estimates are generated using one or more sets of "redundant" receiver pairs. From the multiple velocity estimates, a single improved velocity solution is obtained using (e.g., straight averaging, weighted averaging, etc.) all of the velocity estimates.

The benefit of generating additional velocity estimates using the same pulses but different hydrophones lies in the degree of independence of the estimates. In particular, when using the same pulses but different hydrophones, there are:
- Differences in the amplitude, phase responses, acoustic center drift, and beam patterns of hydrophones (sources of random and bias errors).
- Differences in physical location and orientation of individual hydrophones, as well as array flexure and vibration issues (major sources of bias errors).
- Uncalibrated outboard effects between hydrophone channels, such as those involving cabling, connectorization, and channel integrity issues that affect echo signal and/or noise (sources of random and bias errors).

Ambient noise differences in the ocean and in the vicinity of the ship (the noise field) as well as in the different hydrophone channel electronics (a source of random errors).

A method for a velocity-measuring correlation SONAR in accordance with the illustrative embodiment of the present invention comprises selecting redundant receiver pairs having velocity vectors that are the same as primary receiver pairs upon which a first velocity estimate has been based and then estimating velocity based on said redundant receiver pairs, thereby developing a second velocity estimate.

A velocity-measuring correlation SONAR in accordance with the illustrative embodiment of the present invention comprises a receiver array, wherein said receiver array comprises a plurality of hydrophones; means for developing a first velocity estimate, wherein said first velocity estimate is based on a primary pair of said hydrophones having a first velocity vector; and means for developing a second velocity estimate, wherein said second velocity estimate is based on a redundant pair of said hydrophones having a second velocity vector, wherein said second velocity vector is equal to said first velocity vector.

The illustrative embodiment depicts the invention being applied to Spatial SONAR correlation; however, it is applicable to Temporal correlation sonar, as well.

In some variations of the illustrative embodiment, in addition to or instead of developing additional velocity estimates, the inventive method is used for SONAR fault detection and exclusion to improve correlation SONAR reliability and integrity. Specifically, if the difference between the two (or more) velocity solutions exceeds a threshold, a problem is indicated.

DETAILED DESCRIPTION

Figure 1:
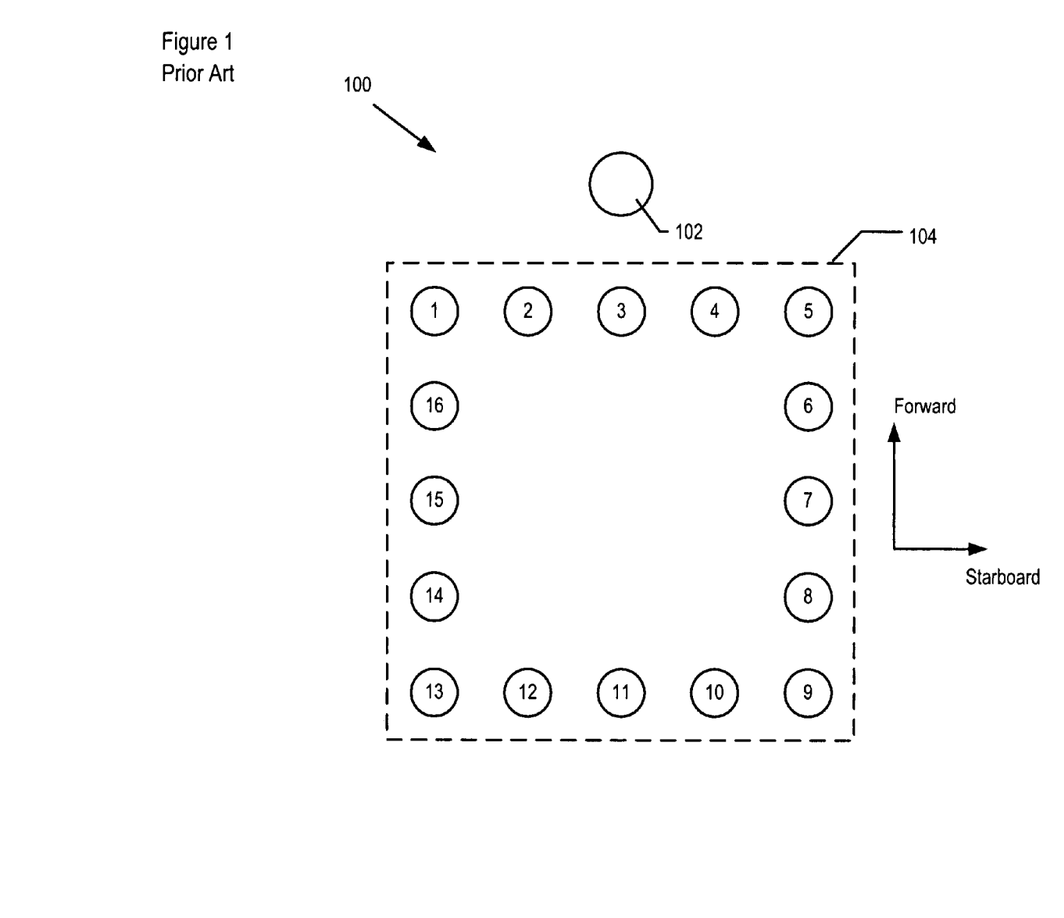
FIG. 1 depicts, figuratively, a first example of a prior-art, velocity-measuring, Spatial correlation SONAR system.

FIG. 1 depicts a schematic of a prior-art velocity-measuring correlation SONAR system. SONAR system 100, which may be mounted on the underside of a ship, comprises transmitter 102 and receiver array 104. Receiver array 104 comprises receivers or hydrophones 1 through 16 (the terms "receiver" and "hydrophone" are used interchangeably herein).

The particular arrangement depicted as array 104 is the Trident SSBN Navigation Sonar System sixteen-hydrophone box array. In this array, receivers 12, 11, and 10 are not normally used. That is, in the prior art, they are used only if there is a failure in other receivers in the array. As used in this Specification, the term "back-up," as applied to hydrophones, means hydrophones that are normally not used. On the other hand, receivers 1-9 and 13-16 are normally active. As used in this Specification, the term "prime," as applied to hydrophones, means hydrophones that are normally active.

Figure 2:
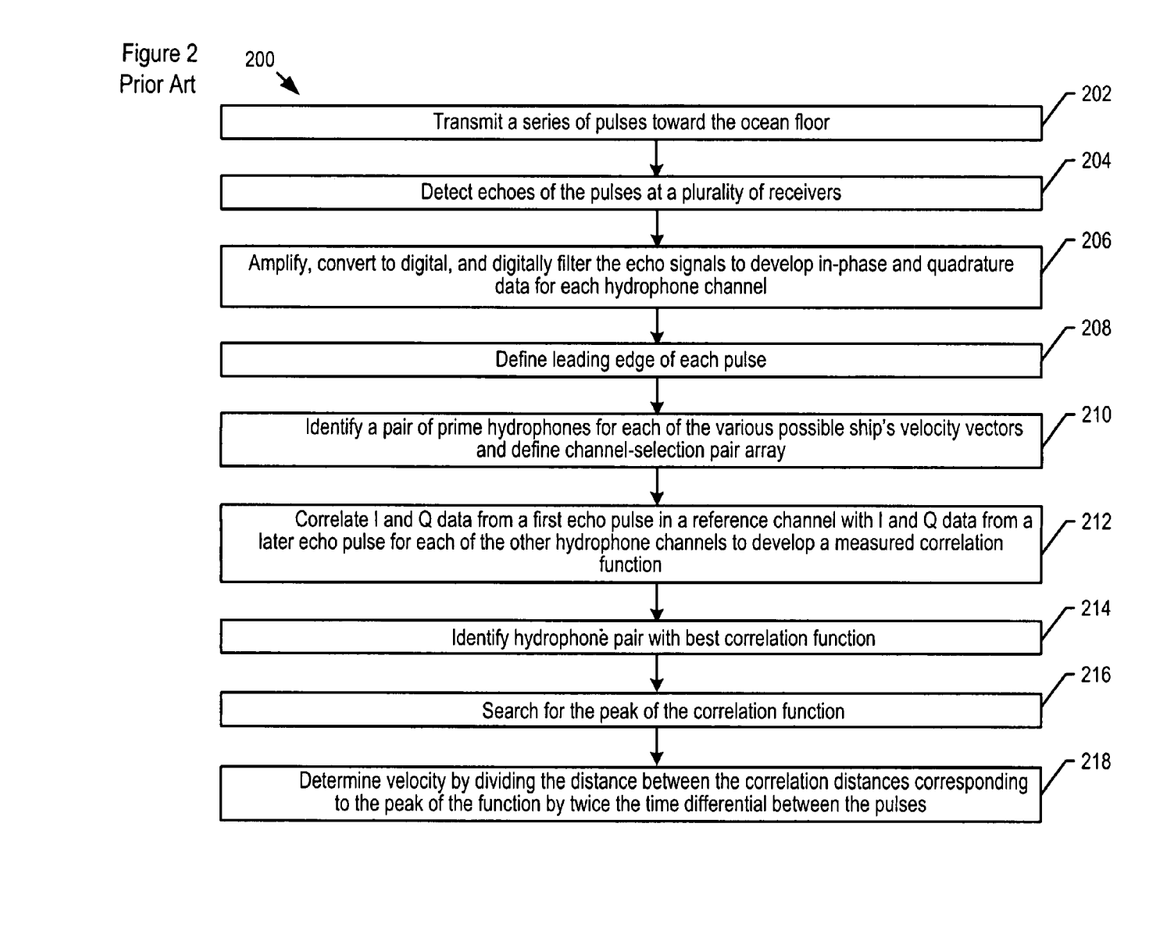
FIG. 2 depicts a prior art method for velocity-measuring, Spatial correlation SONAR.

FIG. 2 depicts prior-art method 200 for velocity-measuring, Spatial correlation SONAR.

In accordance with operation 202 of prior-art method 200, a series of pulses are transmitted vertically towards the ocean bottom. In operation 204, echoes are detected at each prime hydrophone 1-9 and 13-16. For a ground-referenced correlation SONAR, the echoes are returned from the ocean floor. For a water-referenced correlation SONAR, the echoes are returned from the water volume beneath the ship.

At operation 206, pulse echo data is amplified, converted to digital, and then digitally filtered to yield in-phase ("I") and quadrature ("Q") data for each hydrophone channel. This I and Q data contains all of the amplitude and phase information contained in the echo pulses, but is base banded and thus vastly reduced in data rate from the A/D converted echo signals.

In accordance with operation 208, a pulse location algorithm is employed to define the leading edge of each pulse.

At operation 210, a pair of prime hydrophones is identified for each of the various possible ships' velocity vectors, given the arrangement of receiver array 104. Redundant channels—those that have the same velocity (speed and direction) as an identified pair—are not used. For example, if (1, 16) is identified as a receiver pair, then the following pairs would be considered redundant: (16, 15); (15, 14); (14, 13); (5, 6); (6, 7); (7, 8); and (8, 9). Furthermore, no pairing is made for any back-up hydrophone, such as hydrophones 10-12. A channel-selection pair array, which includes all of the possible non-redundant ship's velocity vectors, is created.

As per operation 212, I and Q data from a first echo pulse in a reference channel is correlated with I and Q data from a later echo pulse for each of the other channels. These calculations will form a measured correlation function.

At operation 214, the receiver pair having the best correlation ("the best-correlated receiver pair") is identified.

In accordance with operation 216, in the channel-selection pair array, a 3×3 array of receivers is formed, wherein the array is centered about the best-correlated receiver pair. A search for the peak of the correlation function is performed, which is likely to lie somewhere between the best-correlated receiver pair and another receiver pair in the 3×3 array.

The correlation function is a relationship between the correlation between receiver pairs and their displacement in the x and y directions, where "x" and "y" are fore/aft and athwart ships', respectively. If the peak does lie between receiver pairs, the location of the peak uses an interpolation algorithm to define different spacing and orientation between the receivers. The interpolation provides "correlation distances" in the forward and athwart ship's directions. The velocity is determined in operation 218 by dividing the correlation distances by twice the time differential between the pulses.

In accordance with the illustrative embodiment of present invention, one or more additional substantially independent velocity estimates are obtained by selecting "redundant" receiver pairs that have the same velocity vectors (i.e., speed and direction) as the "primary" receiver pairs. The velocity calculations are then repeated using this redundant receiver pair as the basis.

As used in this specification, the term "primary," when used to refer to hydrophone pairs, means a first group of hydrophone pairs that are used to develop the first velocity estimate. The term "redundant," when used to refer to hydrophones pairs, means a second group of hydrophone pairs that have the same velocity vectors as the primary hydrophone pairs and are used to develop a second, third, etc. velocity estimate.

Figure 3:
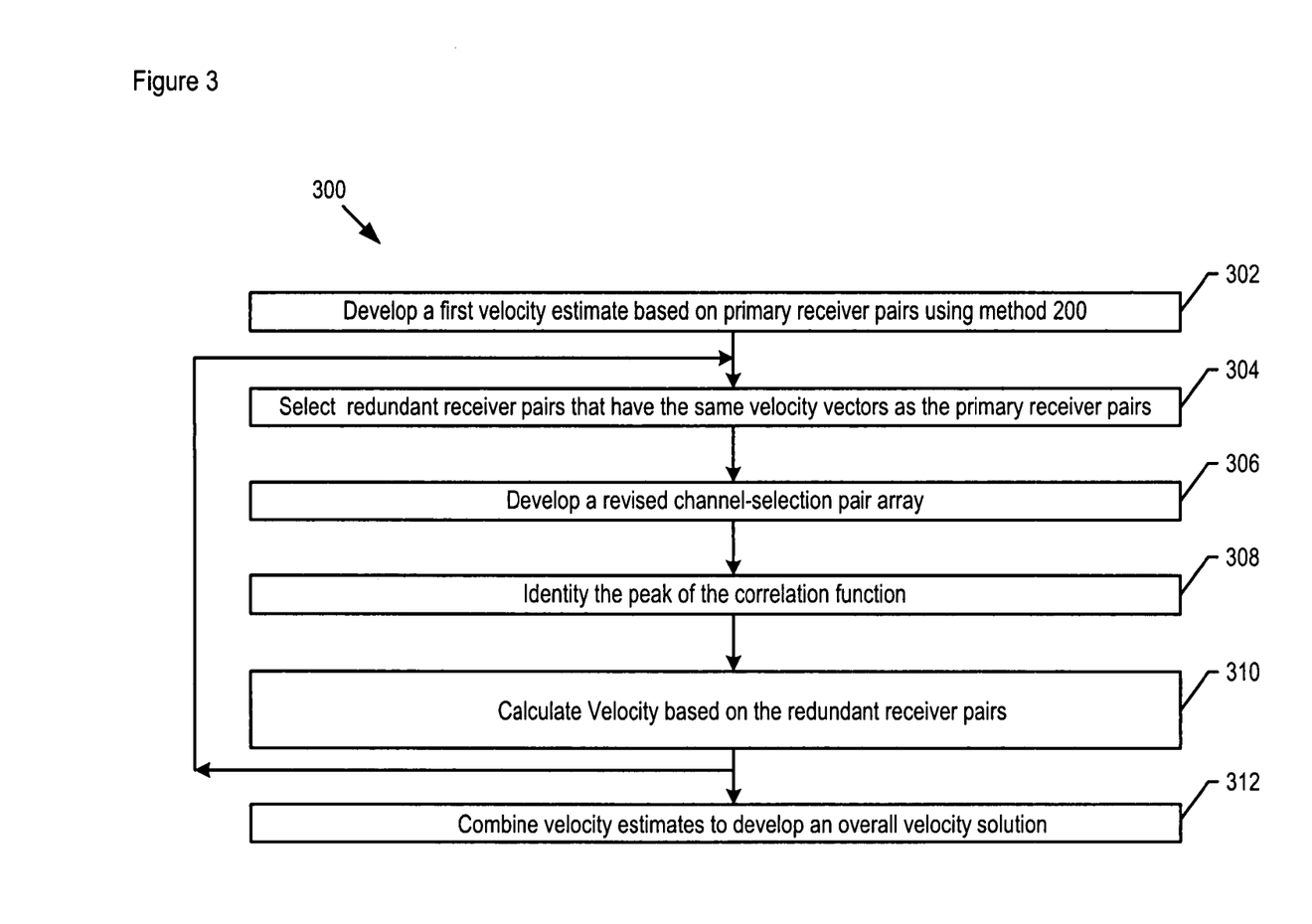
FIG. 3 depicts a method for a velocity-measuring, Spatial correlation SONAR in accordance with the illustrative embodiment of the present invention.

FIG. 3 depicts method 300 for velocity-measuring, Spatial correlation SONAR in accordance with the illustrative embodiment of the present invention. Operation 302 comprises the operations of method 200 (i.e., the prior art). In operation 304, a first set of redundant receiver pairs is designated, wherein those first redundant receiver pairs have the same velocity vectors as the primary receiver pairs, as identified in operation 302.

In operation 306, a revised channel-selection pair array is developed (see, operation 210). In some embodiments, each position in this new array employs a different pair of hydrophones than was used in the original channel selection array. In other words, in such embodiments, the channel-selection pair array includes only redundant receiver pairs.

In accordance with operation 308, the peak of the correlation function is identified (see, operation 216) and the velocity based on the redundant receiver pairs is determined in operation 310 (see, operation 218).

If additional velocity estimates are desired, operation 304 is repeated, designating further sets of redundant receiver pairs, as available, that have the same velocity vector as primary receiver pairs. Operations 306 through 310 are repeated to develop each additional velocity estimate.

In operation 312, an overall velocity solution that is a function of the two or more velocity estimates is developed. In some embodiments, the overall solution is arrived at by simply averaging the individual velocity estimates. Of course, in some other embodiments, the overall solution can be a more complicated function of the individual velocity estimates (e.g., weighted average, etc.).

FIRST COMPARATIVE EXAMPLE

Figure 4:
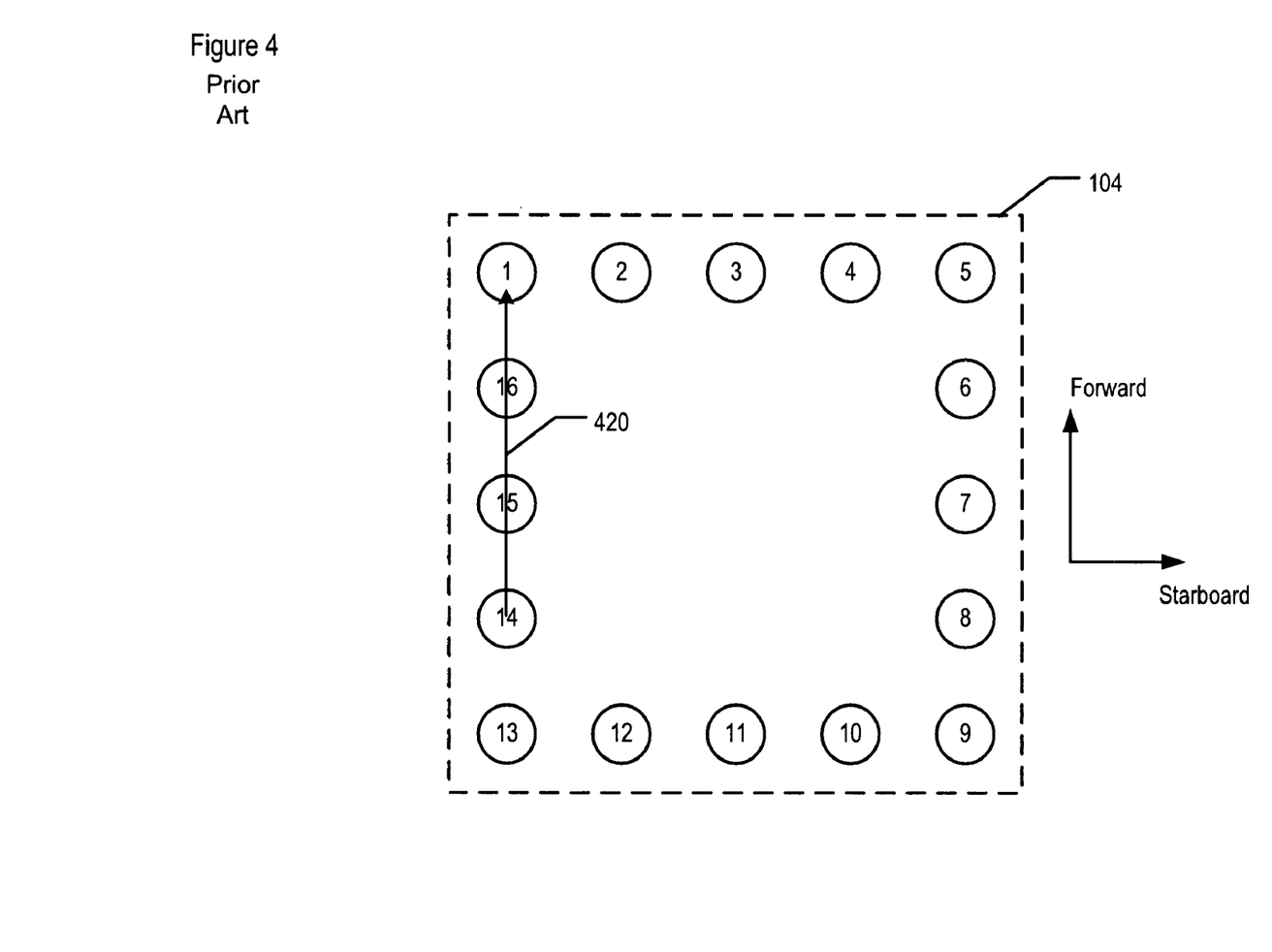
FIG. 4 depicts a first comparative example in the prior art wherein the method of FIG. 2 is applied to the receiver array of FIG. 1.

Prior-art method 200 for a velocity-measuring correlation SONAR is applied to receiver array 104. Operations 202 through 214 are performed to determine that the receiver pair (1, 14) has the best correlation. Velocity vector 420 for best-correlated primary receiver pair (1,14) is depicted in FIG. 4. A velocity estimate is developed based on pair (1,14), as per operations 216 and 218.

EXAMPLE APPLYING THE ILLUSTRATIVE METHOD TO THE FIRST COMPARATIVE EXAMPLE

Figure 5:
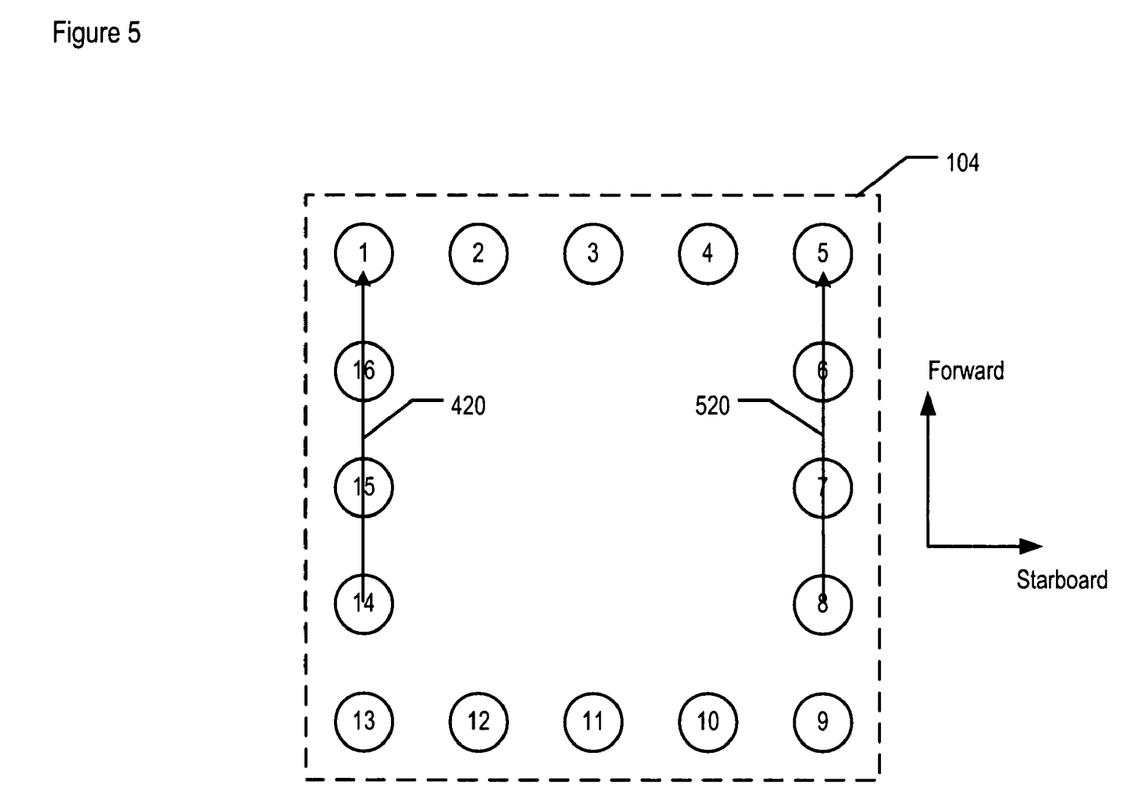
FIG. 5 depicts a second example, wherein the method of FIG. 3 is applied to the scenario described in the first comparative example.

In this Example, the inventive method is applied to the scenario of Comparative Example 1. Instead of developing only a single velocity solution based on the best-correlated primary receiver pair (1, 14) and other primary receiver pairs, a second solution is developed based on a set of redundant receiver pairs that includes a redundant pair that has the same velocity vector as the best-correlated primary receiver pair as well as additional redundant receiver pairs that have the same velocity vector as other primary receiver pairs. Receiver pair (5, 8) is a redundant receiver pair that has the same velocity vector as the best-correlated primary receiver pair. FIG. 5 depicts velocity vector 420 for best-correlated primary receiver pair (1, 14) and velocity vector 520 for corresponding redundant receiver pair (5, 8). Other redundant receiver pairs that correspond to the best-correlated primary receiver pair (1,14) and that could serve as the basis for additional velocity estimates include redundant pairs (16, 13) and (6, 9).

The previous Example depicts the application of method 300 to prime (i.e., normally used) hydrophones in array 104. In other words, in the redundant receiver pair (5, 8), both hydrophones are prime. Some receiver arrays include back-up, inactive hydrophones. For example, in array 104, hydrophones 10-12 are back-up hydrophones. They are only used for velocity estimation if a failure is detected in an active hydrophone. In accordance with method 300, the back-up hydrophones are used, as desired, to create redundant receiver pairs. In this regard, consider the following two Examples.

SECOND COMPARATIVE EXAMPLE

Figure 6:
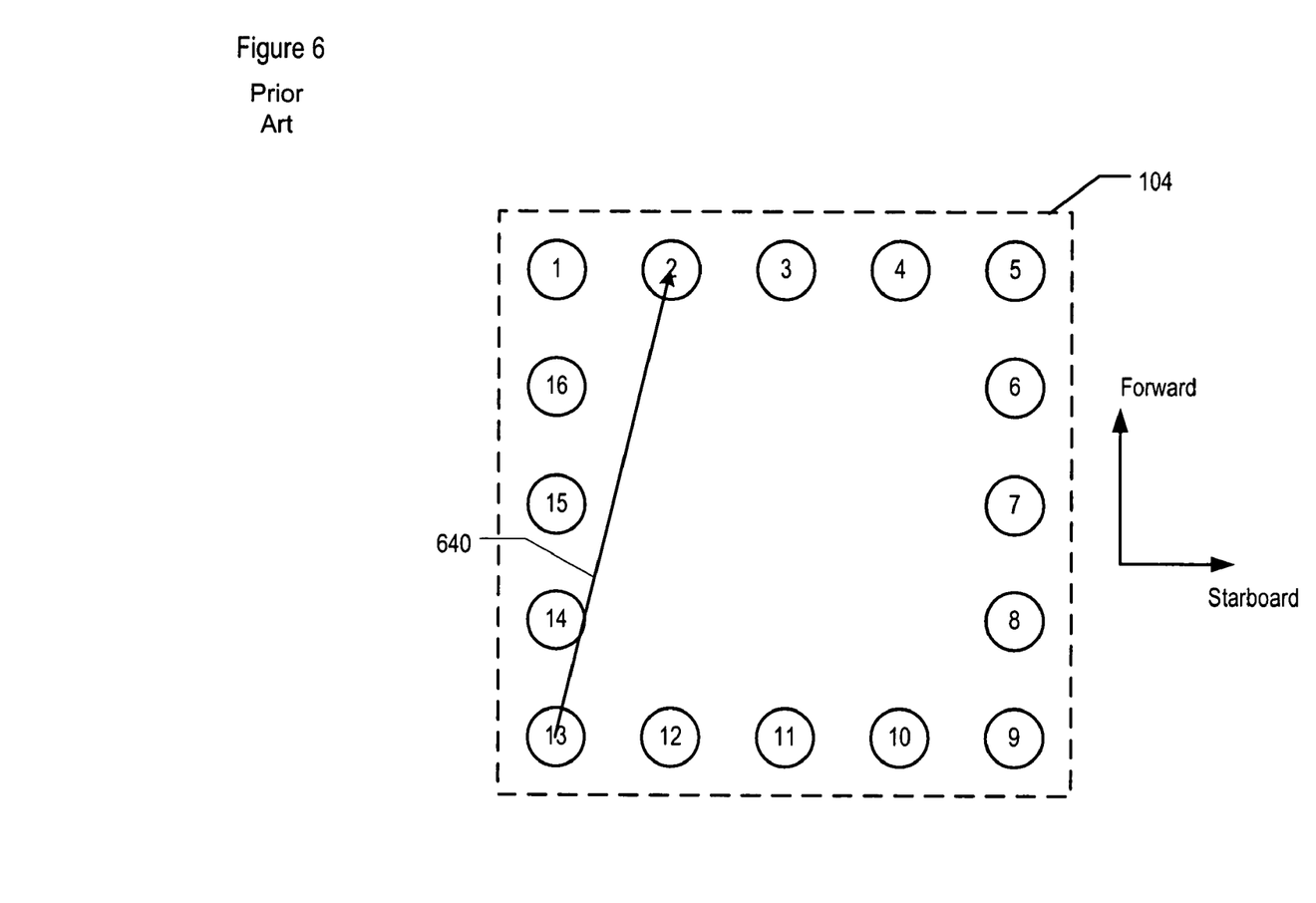
FIG. 6 depicts a second comparative example in the prior art wherein the method of FIG. 2 is applied to the receiver array of FIG. 1.

Prior-art method 200 for a velocity-measuring correlation SONAR is applied to receiver array 104. Operations 202 through 214 are performed to determine that the receiver pair (13, 2) has the best correlation. Velocity vector 630 for best-correlated primary receiver pair (13, 2) is depicted in FIG. 6. A velocity estimate is developed based on best-correlated primary receiver pair (13, 2) and other primary receiver pairs, as per operations 216 and 218.

EXAMPLE APPLYING THE ILLUSTRATIVE METHOD TO THE SECOND COMPARATIVE EXAMPLE

Figure 7:
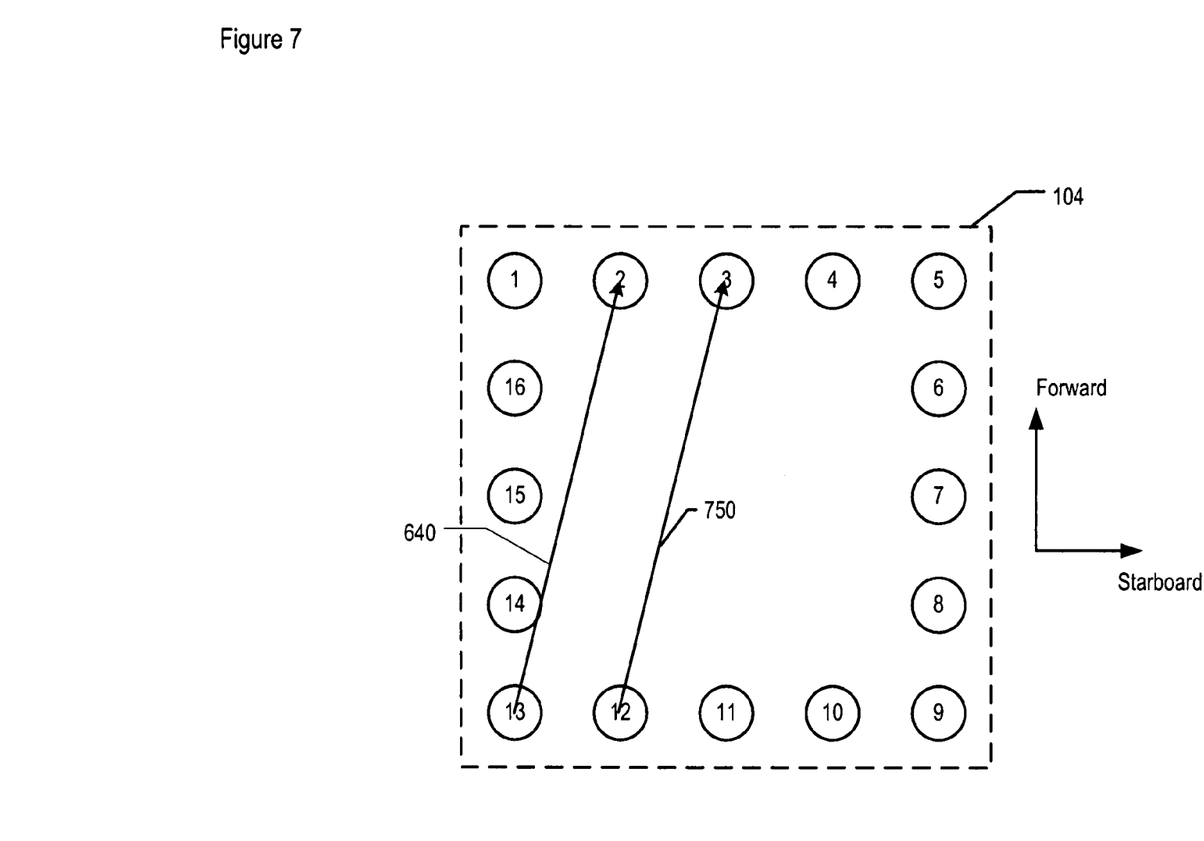
FIG. 7 depicts a fourth example, wherein the method of FIG. 3 is applied to the scenario described in the second comparative example.

In this Example, the inventive method is applied to the same scenario of the Second Comparative Example. A second solution is developed based on redundant receiver pair (12, 3), which has the same velocity vector as the best-correlated primary receiver pair. It is notable that hydrophone 12 is normally a back-up receiver in array 104. FIG. 7 depicts velocity vector 630 for best-correlated primary receiver pair (13, 2) and velocity vector 740 for corresponding redundant receiver pair (12, 3). Other redundant receiver pairs that have the same velocity vector as best-correlated primary pair (13, 2) and that could serve as the basis for additional velocity estimates include redundant pairs (11, 4) and (10, 5). Both these additional redundant pairs incorporate back-up hydrophones.

In an alternative embodiment, before developing the overall velocity solution, the various velocity estimates are compared to one another. If any one velocity estimate differs from any other velocity estimate by more than a threshold, it is likely to be indicative of a problem in at least one of the hydrophone channels. In such a situation, a notification, warning, or exclusion of velocity estimates from the final solution can be implemented.

In the illustrative embodiment, the invention provides an improved Spatial correlation SONAR. The invention is also applicable to provide an improved Temporal correlation SONAR. For both types of correlation SONAR, the improvement pertains to the use of redundant receiver pairs to provide additional, substantially independent velocity estimates to provide an improved overall velocity solution.

Those skilled in the art will understand that there are differences in the way that velocity is calculated for these two types of correlation SONARS. Simply put, Spatial correlation SONAR holds time constant and measures distance while Temporal correlation SONAR holds distance constant and measures time. See, e.g., U.S. Pat. No. 6,804, 167 to Scoca, Huber, and Schwartz ("the '167 Patent") for details concerning velocity calculation for Temporal correlation SONAR and U.S. Pat. No. 4,244,026 to Dickey ("the '026 Patent") for details concerning the velocity calculation for Spatial correlation SONAR. Both the '167 Patent and the '026 Patent are incorporated by reference herein.

The calculations that are performed to determine velocity for Spatial correlation SONAR are the same as for Temporal correlation SONAR, as taught in the '167 Patent, up to and including the calculation of correlation products (see, Col. 3, "$RE_{ij}$" and "$IM_{ij}$"). This includes the calculations pertaining to pulse location, determination of the number of samples to process, the generation of the I/Q data, etc.) Note, however, that the correlation products are based on different points of data for these two types of SONAR.

What differs in the calculation methods for the two types of correlation SONARS is the process by which the best correlation (i.e., the best correlated receiver pair) is determined. For Temporal correlation SONAR, the process provided in the '167 Patent is used; for Spatial correlation SONAR, the matrix-based search process described herein is used. Those skilled in the art will be able to use these processes or other processes to search for the best correlation for the velocity solution.

So, while there are some differences in the velocity calculation techniques, one skilled in the art will readily be able to perform the basic velocity calculation based on a review of the '167 Patent and the '026 Patent. And with an understanding of how to calculate velocity for either Spatial or Temporal correlation SONARS, those skilled in the art we be able to apply the teachings of the present invention relating to the use of additional redundant receiver pairs for the calculation of velocity.

It is understood that the various embodiments shown in the Figures are illustrative, and are not necessarily drawn to scale. Reference throughout the specification to "one embodiment" or "an embodiment" or "some embodiments" means that a particular feature, structure, material, or characteristic described in connection with the embodiment(s) is included in at least one embodiment of the present invention, but not necessarily all embodiments. Furthermore, it is to be understood that the above-described embodiments are merely illustrative of the present invention and that many variations of the above-described embodiments can be devised by those skilled in the art without departing from the scope of the invention. It is therefore intended that such variations be included within the scope of the following claims and their equivalents.

What is claimed is:

1. In a method for a velocity-measuring correlation SONAR, the improvement comprising:
   selecting redundant receiver pairs having velocity vectors that are the same as primary receiver pairs upon which a first velocity estimate has been based; and
   estimating velocity based on said redundant receiver pairs, thereby developing a second velocity estimate; and
   developing a first velocity solution, wherein said first velocity solution is a function of said first velocity estimate and said second velocity estimate.

2. The method of claim 1 wherein said redundant receiver pairs comprise two prime hydrophones.

3. The method of claim 1 wherein at least one of said redundant receiver pairs comprise at least one back-up hydrophone.

4. The method of claim 1 wherein said correlation SONAR is a Spatial correlation SONAR.

5. The method of claim 1 wherein said correlation SONAR is a Temporal correlation SONAR.

6. The method of claim 1 further comprising comparing said first velocity estimate to said second velocity estimate.

7. The method of claim 6 further comprising issuing a notification if a difference between said first velocity estimate and said second velocity estimate exceeds a threshold.

8. The method of claim 1 further comprising:
   obtaining additional velocity estimates;
   rejecting any one or more of said first velocity estimate, said second velocity estimate, or any of said additional velocity estimates if they differ by more than a threshold from an average of said first velocity estimate, said second velocity estimate and said additional velocity estimates; and
   developing a second velocity solution, wherein said second velocity solution is a function of all non-rejected velocity estimates.

9. An apparatus comprising:
   a receiver array, wherein said receiver array comprises a plurality of hydrophones;
   means for developing a first velocity estimate, wherein said first velocity estimate is based on a primary pair of said hydrophones having a first velocity vector; and
   means for developing a second velocity estimate, wherein said second velocity estimate is based on a redundant pair of said hydrophones having a second velocity vector, wherein said second velocity vector is equal to said first velocity vector; and
   means for developing a first velocity solution, wherein said first velocity solution is a function of said first velocity estimate and said second velocity estimate.

10. The apparatus of claim 9 further comprising a transmitter.

11. The apparatus of claim 9 wherein said redundant pair of hydrophones comprises two prime hydrophones.

12. The apparatus of claim 9 wherein said redundant pair of hydrophones comprises at least one back-up hydrophone.

13. The apparatus of claim 9 wherein there are sixteen hydrophones in said receiver array.

14. The apparatus of claim 9 further comprising:
   means for developing additional velocity estimates based on additional redundant pairs of hydrophones; and
   means for obtaining a second velocity solution based on said first velocity estimate, said second velocity estimate, and said additional velocity estimates.

15. The apparatus of claim 14 further comprising means for identifying any one or more of said first velocity estimate, said second velocity estimate, or any of said additional velocity estimates when they differ by more than a threshold amount from an average of said first velocity estimate, said second velocity estimate and said additional velocity estimates.

16. The apparatus of claim 15 further comprising means for excluding, from said second velocity solution, any one or more velocity estimates that are identified as differing by more than said threshold amount.

17. In a method for a velocity-measuring correlation SONAR, the improvement comprising:
   selecting redundant receiver pairs having velocity vectors that are the same as primary receiver pairs upon which a first velocity estimate has been based; and
   estimating velocity based on said redundant receiver pairs, thereby developing a second velocity estimate;
   comparing said first velocity estimate to said second velocity estimate; and
   issuing a notification if a difference between said first velocity estimate and said second velocity estimate exceeds a threshold.

18. In a method for a velocity-measuring correlation SONAR, the improvement comprising:

selecting redundant receiver pairs having velocity vectors that are the same as primary receiver pairs upon which a first velocity estimate has been based; and estimating velocity based on said redundant receiver pairs, thereby developing a second velocity estimate, wherein at least one of said redundant receiver pairs comprise at least one back-up hydrophone.

* * * * *

UNITED STATES PATENT AND TRADEMARK OFFICE
CERTIFICATE OF CORRECTION

PATENT NO.        : 7,295,492 B2                                      Page 1 of 1
APPLICATION NO.   : 11/327702
DATED             : November 13, 2007
INVENTOR(S)       : Scoca et al.

It is certified that error appears in the above-identified patent and that said Letters Patent is hereby corrected as shown below:

Col. 1, lines 8-9

Insert following the title:

-- GOVERNMENT INTEREST

This invention was made with Government support under Government Contract No. N00030-04-C-0014 awarded by the Department of the Navy. The Government has certain rights in the invention. --

Signed and Sealed this
Twenty-sixth Day of April, 2011

David J. Kappos
*Director of the United States Patent and Trademark Office*